(12) United States Patent
Welch et al.

(10) Patent No.: US 7,089,027 B1
(45) Date of Patent: Aug. 8, 2006

(54) METHOD AND SYSTEM FOR ADVANCED TERMINATION OF COMMUNICATION SESSIONS

(75) Inventors: David Welch, Shawnee, KS (US); Christopher M. Doran, Sunnyvale, CA (US); Konstantin Othmer, Mountain View, CA (US); Andrew D. Stadler, San Francisco, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 421 days.

(21) Appl. No.: 10/636,723

(22) Filed: Aug. 7, 2003

(51) Int. Cl.
*H04Q 7/20* (2006.01)
*H04B 7/00* (2006.01)

(52) U.S. Cl. ............... 455/521; 455/426.1; 455/435.1; 455/445; 455/401

(58) Field of Classification Search .......... 455/426.1, 455/426.2, 435.1, 445, 414.1, 401, 404.1, 455/507–515, 518, 520, 521, 554.1, 554.2; 370/352–356, 342
See application file for complete search history.

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A * | 11/1999 | Yao et al. | 455/426.1 |
| 6,014,556 A | 1/2000 | Bhatia et al. | |
| 6,032,051 A | 2/2000 | Hall et al. | |
| 6,041,241 A | 3/2000 | Willey | |

(Continued)

FOREIGN PATENT DOCUMENTS

EP      0 817 457      1/1998

(Continued)

OTHER PUBLICATIONS

International Search Report from International Application No. PCT/US2003/02950, dated Jan. 30, 2003.

(Continued)

*Primary Examiner*—Duc M. Nguyen

(57) ABSTRACT

A method and system that helps to reduce delay in initiating communication sessions. A network entity operates as a signaling agent on behalf of a terminating node and positively acknowledges a session initiation request on behalf of the terminating node without first receiving a positive acknowledgement from the terminating node. For example, the network entity may first send an alert message to the terminating node and then positively respond to the session initiation request before receiving from the terminating node a response to the alert message. As another example, the network entity may first positively respond to the session initiation request and then send an alert message to the terminating node. This arrangement can advantageously allow the session setup process to continue, without first waiting for an actual positive acknowledgement from the terminating node.

26 Claims, 6 Drawing Sheets

U.S. PATENT DOCUMENTS

| | | | |
|---|---|---|---|
| 6,119,017 | A | 9/2000 | Cassidy et al. |
| 6,178,323 | B1 | 1/2001 | Nagata |
| 6,256,612 | B1* | 7/2001 | Vo et al. ............. 704/500 |
| 6,381,467 | B1 | 4/2002 | Hill et al. |
| 6,490,452 | B1 | 12/2002 | Boscovic et al. |
| 6,526,377 | B1 | 2/2003 | Bubb |
| 6,597,702 | B1* | 7/2003 | Caugherty ............. 370/410 |
| 6,654,602 | B1* | 11/2003 | Fye et al. ............. 455/418 |
| 2002/0055364 | A1 | 5/2002 | Wang et al. |
| 2002/0071445 | A1 | 6/2002 | Wu et al. |
| 2002/0145990 | A1 | 10/2002 | Sayeedi |
| 2002/0147818 | A1 | 10/2002 | Wengrovitz |
| 2002/0150092 | A1* | 10/2002 | Bontempi et al. ........ 370/389 |
| 2002/0172165 | A1 | 11/2002 | Rosen et al. |
| 2002/0172169 | A1 | 11/2002 | Rosen et al. |
| 2002/0173325 | A1 | 11/2002 | Rosen et al. |
| 2002/0173326 | A1 | 11/2002 | Rosen et al. |
| 2002/0173327 | A1 | 11/2002 | Rosen et al. |
| 2002/0177461 | A1 | 11/2002 | Rosen et al. |
| 2002/0191583 | A1 | 12/2002 | Harris et al. |
| 2002/0197994 | A1* | 12/2002 | Harris et al. ........... 455/445 |
| 2003/0008657 | A1 | 1/2003 | Rosen et al. |
| 2003/0017836 | A1* | 1/2003 | Vishwanathan et al. .... 455/517 |
| 2003/0021264 | A1 | 1/2003 | Zhakov et al. |
| 2003/0114156 | A1 | 6/2003 | Kinnavy |

FOREIGN PATENT DOCUMENTS

| | | |
|---|---|---|
| EP | 0 984 608 | 3/2000 |

OTHER PUBLICATIONS

Office Action from U.S. Appl. No. 10/067,080, dated May 21, 2003.

Office Action from U.S. Appl. No. 10/067,080, dated Apr. 27, 2004.

International Search Report from International Application No. PCT/US02/31411, dated Mar. 4, 2003.

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

International Search Report from International Application No. PCT/US03/02950, dated Nov. 6, 2003.

U.S. Appl. No. 10/277,465, filed Oct 22, 2002 entitled "Method for Call Setup Using Short Data Bursts".

3rd Generation Partnership Project 2 "3GPP2", Fast Call Set-Up, Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push-to-Talk'," http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22. 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI," Network Working Group, Apr. 2001.

Ericsson, www.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum Systesm, IS-2000-3, Jul. 12, 1999.

3rd Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Rigney et al., "Remote Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, Discussion and definitions on PoC Floor Control, Input Contribution, Doc #OMA-REQ-2003-0375-PoC_Floor_Control, Jun. 2, 2003.

OMA, "PoC Use case: Mobile—PC Example," Input Contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC UseCase-group-multimedia-scenario, May 6, 2003.

OMA, "PoC Use case: Examples of User Requirements," Input Contribution, Doc #OMA-REQ-2003-0305-PoC Use Case, May 6, 2003.

OMA, "Inputs for PoC Requirements Document," Input Contribution, Doc #OMA-REQ-2003-0367-PoC_Input_Motorola, May 29, 2003.

OMA, "Push to Talk over Cellular (PoC)," Version: 0.1.6. May 12, 2003.

* cited by examiner

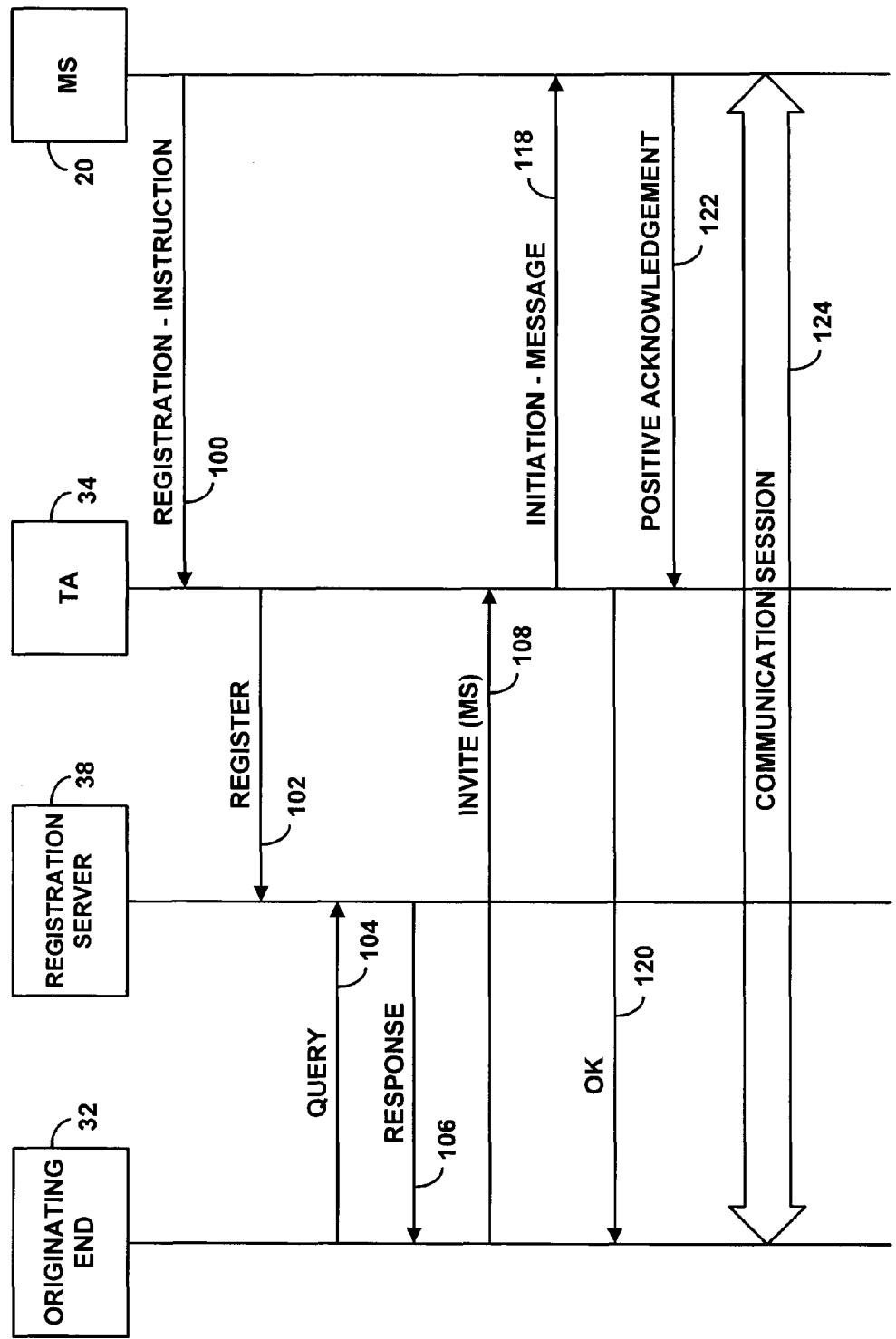

METHOD AND SYSTEM FOR ADVANCED TERMINATION OF COMMUNICATION SESSIONS

FIELD OF THE INVENTION

The present invention relates to network communications and more particularly to methods and systems for setting up network communication sessions.

BACKGROUND

Generally speaking, in order to establish a communication session between two or more nodes over a network, a setup signaling process will occur. The entities involved in the setup signaling process, and the particular steps of the process, may depend on various factors, such as the capabilities of the nodes and the arrangement of the network.

In some scenarios, participating nodes may exchange setup signaling messages with each other. For instance, if both nodes sit on a packet-switched network such as the Internet and are compliant with the well known Session Initiation Protocol (SIP), one node (the "originating" node) might send a SIP "INVITE" message to the other node (the "terminating" node), specifying a type of session desired. The terminating node may then respond with a SIP "200 OK" message, agreeing to participate, and the originating node may then send a SIP "ACK" to the terminating node, to complete the setup signaling. The originating and terminating nodes may then start engaging in the specified type of session with each other.

In other scenarios, either or each node might be served by a signaling proxy, such as a gateway (e.g., network access server) or switch, which can function to engage in setup signaling on behalf of the node. An example of this occurs in a telephone system, in which each telephone or other telephony device at the end of a call is served by a network switch or gateway, and the switches or gateways are coupled together by a transport network such as the public switched telephone network (PSTN) or the Internet. In particular, an originating phone may be served by an originating switch/gateway, and a terminating phone may be served by a terminating switch/gateway. (Alternatively, the two ends may be served by a common switch/gateway.)

In this arrangement, when a user of the originating phone places a call to the terminating phone, the originating phone may send tones representing the dialed phone number to the originating switch/gateway, and the originating switch/gateway may then respond by sending a call setup message to the terminating switch/gateway. The call setup message may take various forms, depending on the form of the transport network. For example, if the switches/gateways are coupled together by a circuit-switched network such as the PSTN, then the call setup message might be an industry standard "ISUP" Initial Address Message (IAM), which might pass through an out-of-band signaling system between the switches/gateways. As another example, if the switches/gateways are coupled together by a packet-switched network such as the Internet, then the call setup message might be a SIP INVITE or other such session setup message.

Upon receipt of setup message, the terminating switch/gateway would then send an alert signal such as a ring signal to the terminating phone, in response to which a user of the terminating phone (or the phone itself) may take the terminating phone off hook. When the terminating switch/gateway detects the off hook condition, it responsively sends a positive acknowledgement signal to the originating switch/gateway. And the originating switch/gateway then routes the call over the transport network to the terminating switch/gateway. With a call path thus established between the originating and terminating phones, the call may then begin.

In an alternative arrangement, by way of example, it is possible that only one of the phones may be served by a gateway/switch, in which case one phone may directly engage in setup signaling with the other phone's gateway/switch. For instance, if the originating phone includes a SIP client, the originating phone may send a SIP INVITE over a packet-switched network to the terminating switch/gateway, seeking to set up a call with the terminating phone. The terminating switch/gateway would then page the terminating phone, and, when the terminating phone goes off hook, the terminating switch/gateway would positively respond to the originating phone. After completing the setup signaling, the call could then begin.

It is also possible that more than two nodes may be involved in the setup process. For instance, an originating node may seek to set up a conference session with multiple terminating nodes. To do so, either the originating node or a conference server (or switch/gateway) acting on behalf of the originating node might send session setup messages to each of the terminating nodes, or to switches/gateways serving the terminating nodes. Session legs could then be established between the various nodes, and those legs could be bridged together to establish a conference.

In general, regardless of whether a terminating node is served by a proxy, the process of setting up a communication session will typically involve exchanging setup signaling with the terminating node in order to determine whether the terminating node will participate in the session. In particular, a session invitation of some sort (e.g., a SIP INVITE, or a ring signal) will be sent to the terminating node. If the terminating node agrees to participate in the session, the terminating node will then positively acknowledge the invitation (e.g., by going off hook or by sending a SIP 200 OK).

The process can work perfectly well in a scenario where the terminating node has an available link with the network over which to exchange such messages. However, a significant delay in the setup process can occur if the terminating node does not have such a link when the network seeks to send a session invitation to the terminating node. In that scenario, the terminating node must first acquire the link in order to engage in setup signaling.

An example of this delay can occur in a cellular wireless communication system, where a wireless client station can have a "dormant" mode in which it lacks a radio link over which it can physically communicate.

In a "3G" cellular wireless system, for instance, a mobile station may lose its radio link and thus enter a dormant mode after a certain period of time during which no data flows between the mobile station and a base station. When the base station thereafter receives packet data that is being transmitted to an IP address of the mobile station, the base station may need to re-establish the mobile station's radio link. To do so, the base station would page the mobile station over a radio control channel, and the mobile station would responsively request use of a radio traffic channel. In response, the base station would instruct the mobile station to operate on a particular traffic channel, and the base station may then transmit the packet data over that traffic channel to the mobile station.

In a typical 3G wireless system, this process of waking up a terminating mobile station to deliver incoming packet data can sometimes take over 5 seconds to complete, at least in part because the mobile station may only periodically monitor the control channel for page messages. If the incoming packet data represents a session invitation, such as a SIP INVITE for instance, such a delay in setting up the requested communication session can sometimes be problematic. Therefore, an improvement is desired.

SUMMARY

An exemplary embodiment of the present invention provides a method and system that helps to reduce this delay in initiating communication sessions. The solution is to have a network entity operate as a signaling agent on behalf of a terminating node and positively acknowledge a session initiation without first receiving a positive acknowledgement from the terminating node, and perhaps even without first sending a message to the terminating node to alert the terminating node that a session is being set up. This will allow the session setup process to continue, without first waiting for an actual positive acknowledgement from the terminating node.

The exemplary embodiment is particularly useful when the session being initiated is a real-time media session, such as a voice-over-IP (VoIP) session, and even more particularly when the terminating node is a cellular/PCS station. The exemplary embodiment will therefore be described mainly in that context. However, it should be understood that the exemplary embodiment could extend as well to use in the initiation of other sorts of communication sessions between other sorts of stations.

According to the exemplary embodiment, the network entity, which will be referred to as a "terminal agent," can sit on a packet network and can communicate with a client station through packet-data communications, such as UDP/IP communications for instance. The terminal agent and client station can communicate with each other through any agreed protocol or message set, the specific details of which are not important. One terminal agent could serve multiple client stations, or each client station could be served by a respective terminal agent.

In exemplary operation, a client station will first cause its terminal agent to register with the network on behalf of the client station and, more specifically, to give the network a correlation between the terminal agent's IP address and an identifier of the client station (e.g., a phone number or SIP address of the client station or of a user of the client station). For instance, the client station may send a registration message to the terminal agent, and the terminal agent could programmatically respond to the registration message by recording the correlation with a registration server (e.g., name registration server, presence server, or the like) in the network.

Thereafter, when another entity seeks to initiate a session with the client station at that identifier, an invitation will pass to the terminal agent's network address. And the terminal agent will then positively respond to the invitation without first receiving a positive acknowledgement from the client station, and perhaps even without first notifying the client station of the session initiation effort.

In one scenario, for instance, the terminal agent may respond to the invitation by (i) sending an initiation-message to the client station and then (ii) sending a positive response to the originating end, without waiting for a positive acknowledgement from the client station. In another scenario, for instance, the terminal agent may (i) send a positive response to the originating end and then (ii) send an initiation-message to the client station.

In either case, the initiation-message could take any agreed form, such as a binary-coded message sent as packet data between the terminal agent and client station. And the initiation-message will preferably include sufficient information to allow the client station to prepare for participation in the session. Thus, for instance, the initiation-message may identify the originating node's network address and may describe the type of session being initiated. The client station may then positively acknowledge the initiation-message, by sending an agreed-form response message to the terminal agent. By this time, however, the terminal agent will have already sent a positive response to the originating end.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 7 is another message flow diagram illustrating some of the functions that could be carried out in accordance with the exemplary embodiment.

DETAILED DESCRIPTION OF AN EXEMPLARY EMBODIMENT

1. Overview

Figure 1:
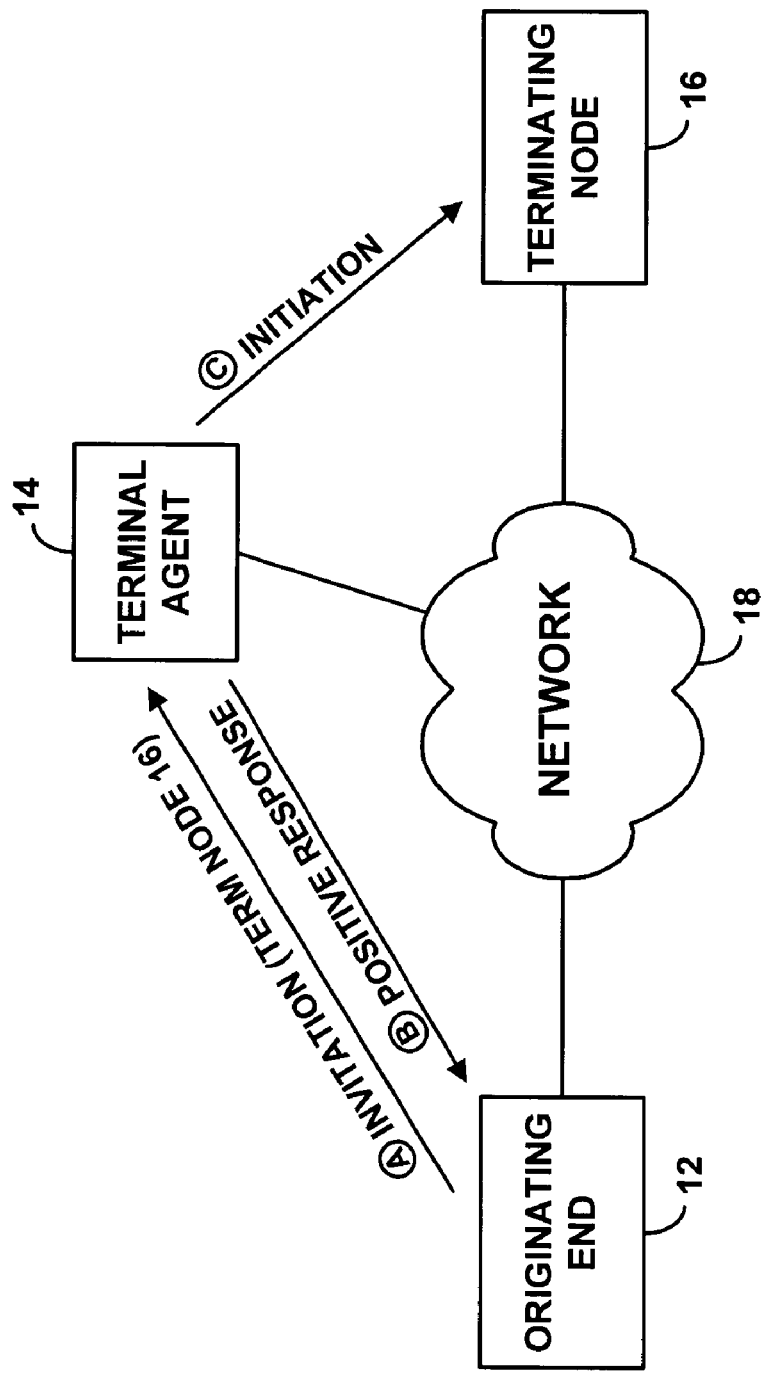
FIG. 1 is a simplified block diagram of a system arranged according to the exemplary embodiment.

Referring to the drawings, FIG. 1 is a simplified block diagram of a system arranged in accordance with an exemplary embodiment. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Still further, various functions described herein as being performed by one or more entities may be carried out by a processor executing an appropriate set of machine language instructions stored in memory. Alternatively or additionally, various functions described could be carried out by firmware and/or hardware.

The system of FIG. 1 includes an originating end 12, a terminal agent 14, and a terminating node 16, each of which are linked to a network 18. The originating end 12 may comprise an originating node (e.g., a client station, a conference server, or some other entity), which may seek to establish a communication session over network 18 with the terminating node 16. Further, the originating end 12 may comprise a proxy sever, such as a switch or gateway that engages in setup signaling on behalf of the originating node.

In the exemplary embodiment, the terminal agent (TA) 14 serves the terminating node 16 (and perhaps other terminating nodes as well). Thus, TA 14 preferably functions to exchange setup signaling messages on behalf of terminating node 16, and TA 14 also preferably functions to communicate with terminating node 16 to facilitate the session setup process. As such, TA 14 may take the form of a proxy server, such as a switch or gateway, or TA 14 may take other forms.

TA 14 may sit generally on network 18 at a network address, and other entities on the network may send communications to TA 14 at that network address. Alternatively or additionally, if terminating node 16 has an access channel to network 18, TA 14 may sit within that access channel, so that communications to and from terminating node 16 would necessarily pass through TA 14.

Terminating node 16, in turn, is generally any communication device, preferably capable of engaging in communications over network 18. For example, terminating node 16 could be a landline or wireless telephone, a computer or other communication device.

FIG. 1 further depicts an exemplary setup signaling process that may occur when originating end 12 seeks to set up a session with terminating node 16. As shown in FIG. 1, at step A, the originating end 12 sends a session-invitation message to TA 14, seeking to set up a session with terminating node 16. In this regard, the originating end 12 could determine that TA 14 serves terminating node 16 and can responsively send the session-invitation to TA 14. Alternatively, the originating end could send the session-invitation to a proxy server, and the proxy server can determine that TA 14 serves terminating node 16 and can responsively forward the session-invitation to TA 14. Still alternatively, the originating end could send the session-invitation to terminating node 16, and TA 14 might intercept the invitation on its way (for instance, if TA 14 sits in the terminating node's access channel). Other routing processes are possible as well.

At step B, TA 14 may then positively respond to the session-invitation message before alerting (notifying) terminating node 16 of the session initiation effort. In particular, TA 14 may send a positive response to the originating end 12, indicating that terminating node 16 is available and willing to participate in the requested session.

At step C, TA 14 may then send an initiation message to terminating node 16, to alert terminating node 16 of the session initiation effort. For instance, TA 14 may forward to terminating node 16 the session-invitation that TA 14 received from the originating end 12. Alternatively, TA 14 may send the initiation message to terminating node 16 in some other manner.

By having the TA 14 positively respond to the session-invitation before alerting the terminating node 16 of the session initiation effort, the process of setting up a session with terminating node 16 can proceed without waiting for the terminating node 16 to receive and respond to a session initiation request. This is particularly advantageous in a scenario where the terminating node 16 must first acquire a communication link with the network in order to be able to receive a session initiation request. However, the exemplary embodiment can extend to other scenarios as well.

Figure 2:
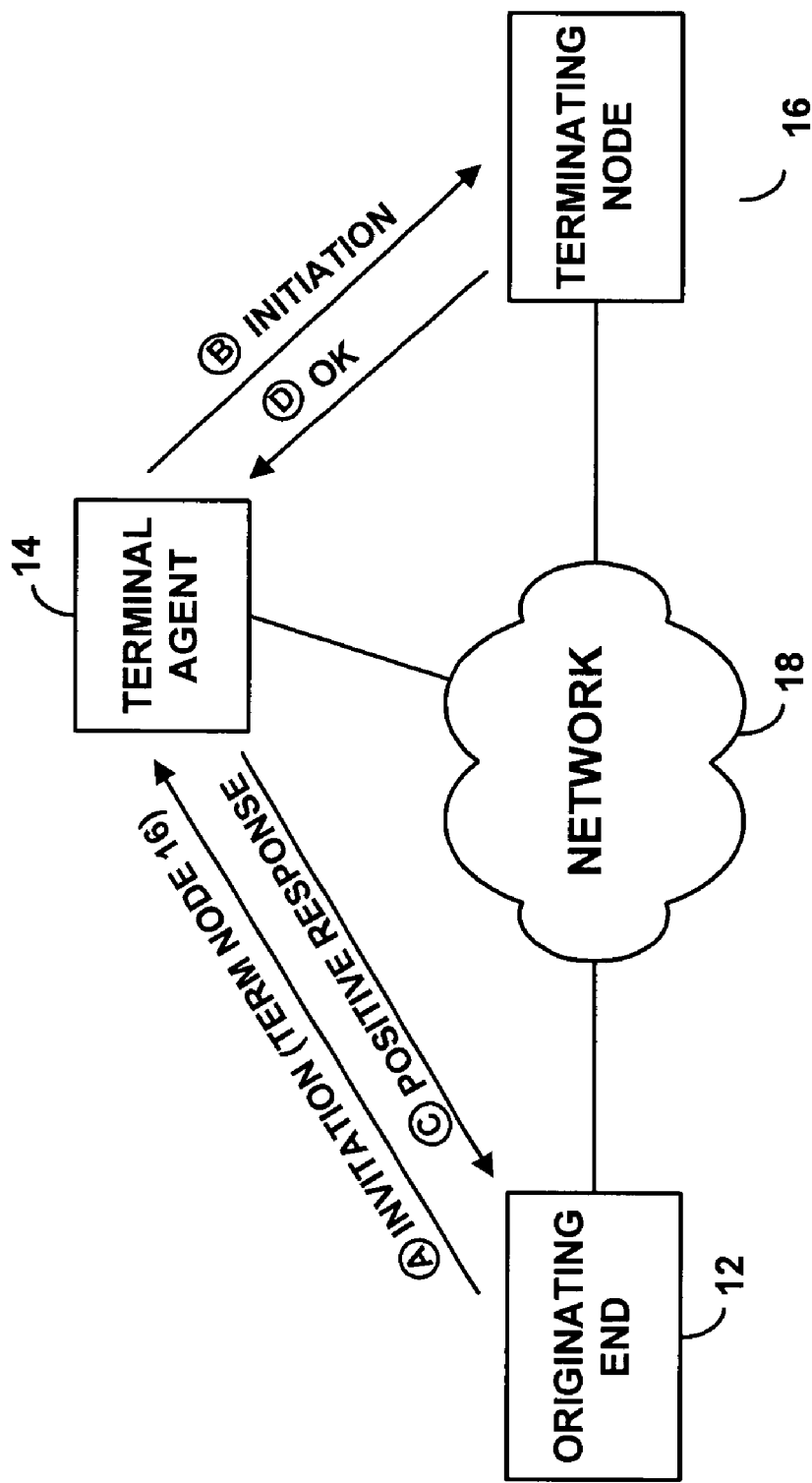
FIG. 2 is another simplified block diagram of a system arranged according to the exemplary embodiment.

FIG. 2 next depicts a variation on the process shown in FIG. 1. In particular, FIG. 2 illustrates that TA 14 can alternatively respond to the originating end after the TA sends a session initiation message to the terminating node 16, but before TA 14 receives a response from terminating node 14.

In this alternative arrangement, at step A, the originating end first sends a session invitation message to TA 14, seeking to set up a session with terminating node 16. At step B, TA 14 then sends a session-initiation message to terminating node 16 (i.e., TA 14 outputs the message for transmission to terminating node 16). Thereafter, at step C, TA 14 positively responds to the session invitation on behalf of terminating node 16, without first receiving a positive acknowledgement from terminating node 16. And at step D, TA 14 then receives a positive acknowledgement from terminating node 16.

A benefit of this alternative arrangement is that the process of positively responding to the originating end can take place concurrently with the process of delivering the session-initiation message to the terminating node 16. In particular, the TA 14 can work to positively respond to the originating end while the network infrastructure is working to deliver the session initiation message to the terminating node 16 (including waking up the terminating node 16, if necessary). Thus, the effective delay that occurs from delivering the session-initiation message to the terminating node 16 can be reduced.

2. Exemplary Architecture a. Exemplary Network

Figure 3:
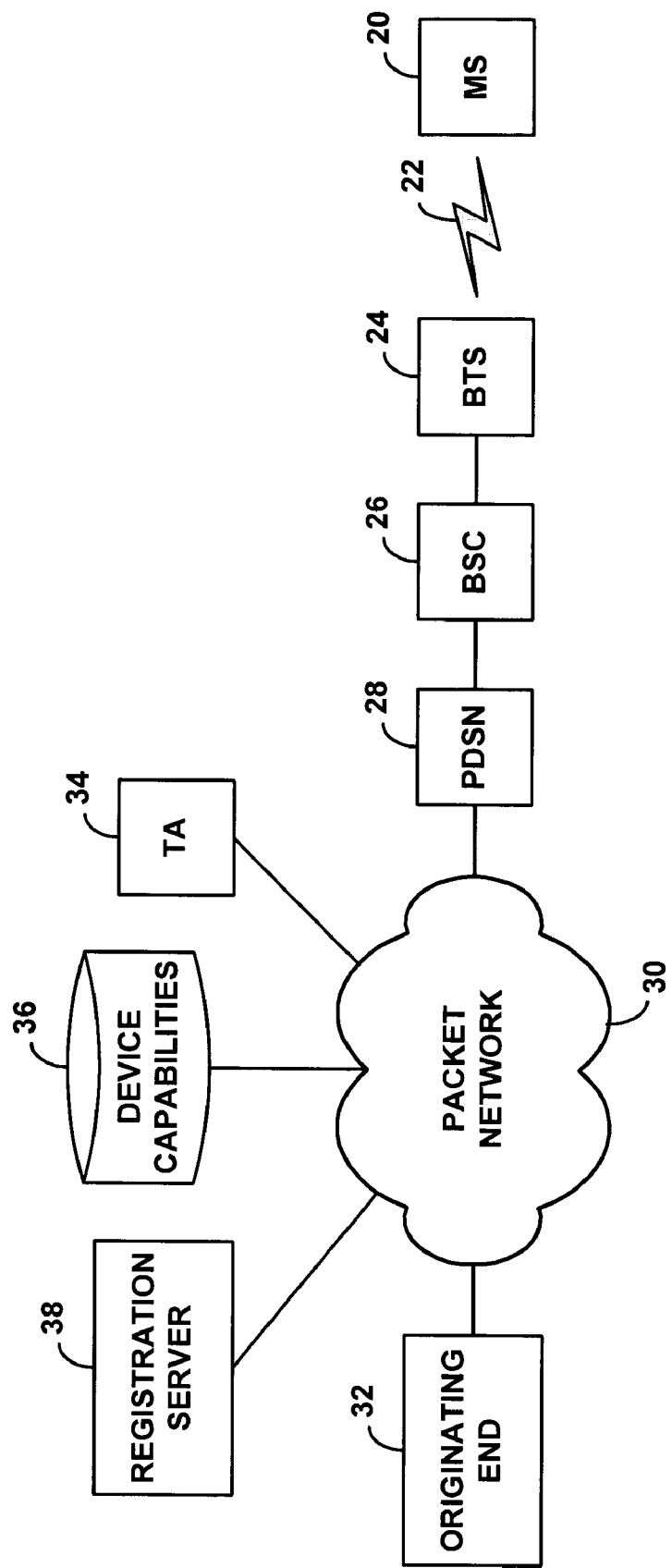
FIG. 3 is a block diagram of a wireless communication system in which the exemplary embodiment could be employed.

The exemplary embodiment is particularly useful in a wireless communication system, such as a 3G (or later) wireless communication system. FIG. 3 is a simplified block diagram of such a system, arranged in accordance with the exemplary embodiment.

As shown in FIG. 3, the wireless communication system includes a wireless station such as a mobile station (MS) 20, which can communicate over an air interface 22 with a base transceiver station (BTS) 24. The BTS 24 is in turn coupled with a base station controller (BSC) 26 that is then coupled with a network access server such as a packet data serving node (PDSN) 28. The PDSN 28 then provides connectivity with a packet data network 30.

As further shown in FIG. 3, a number of other entities may be coupled by conventional means with network 30. These other entities may include an originating end 32, a TA 34, a device capabilities store 36 and a registration sever 38. Generally speaking, the originating end 32 will send a session invitation seeking to set up a communication session with MS 20, the TA 34 will receive or detect that session invitation and respond to the invitation on behalf of MS 20 without first notifying MS 20 of the session initiation effort, the device capabilities store 36 will hold data indicating capabilities, preferences, authorizations and/or other information about client stations such as MS 20, and the registration server 38 will hold correlations between device or user IDs and network addresses at which the devices or users can be contacted.

The various entities on network 30 could be discrete entities or could be combined with each other or with other entities. By way of example, the device capabilities store could reside on a database server that sits at a discrete IP address on network 30, or the store could be integrated as part of TA 34. And as another example, the registration server 38 could be a discrete server (such as a presence server, name registration server, or the like) sitting at an IP address on the network, or it could be a function of TA 34. Other examples, and variations on these examples, are also possible.

Further, although network 30 is shown as a single element in FIG. 3, it should be understood that the network could be a combination of networks. For example, network 30 could be a combination of (i) a private packet network (e.g., a wireless carrier's core packet network) to which PDSN 28 connects and which can thus serve as an access channel for MS 20, and (ii) a public packet network (e.g., the Internet) coupled to the private packet network through a firewall. In the exemplary embodiment, TA 34, device capabilities store 36 and registration server could then reside on either the private network or the public network.

In the exemplary embodiment, MS 20 and BSC 26 preferably communicate with each other over air interface 22 according to an accepted air interface protocol such as CDMA, TDMA or GSM. By way of example, the air interface protocol may be cdma2000, which is defined by EIA/TIA/IS-2000a ("IS-2000"), as published by the Electronics Industry Association/Telecommunications Industry Association. Further, MS 20, BSC 26 and PDSN 28 are preferably compliant with well known 3GPP2 industry recommendations for wireless IP network connectivity, so that MS 20 can engage in packet data communications over network 30.

In the exemplary embodiment, in order for MS 20 to be able to engage in packet data communications, MS 20 will establish a radio link with BSC 26, and MS 20 will establish a data link with PDSN 28. For instance, MS 20 may conventionally send an origination request to BSC 26, and BSC 26 may responsively assign a wireless traffic channel (radio link) for use by MS 20 over air interface 22. Further, BSC 26 may pass the origination request to PDSN 28, and MS 20 and PDSN 28 may then negotiate with each other to set up a data link such as a point-to-point protocol (PPP) link for instance. In this process, PDSN 28 will typically assign to the MS 20 an IP address (likely a mobile-IP address) that the MS 20 can then use in data communications over network 30. MS 20 may then engage in packet data communications via its radio link and data link, as though it were directly connected to network 30 at its assigned IP address.

Also conventionally, after a certain period of time during which no data flows over the air interface between MS 20 and BSC 26, BSC 26 may release the radio link that had been assigned to MS 20. However, MS 20 might still maintain its IP address and data link. In this dormant state, a network entity could send packet data, such as a SIP INVITE, to the registered IP address of the MS, but the BSC would not be able to forward the packet data over the air interface to the MS, since the MS would not have an assigned traffic channel over the air interface.

When BSC 26 receives packet data destined for the IP address of dormant MS 20, BSC 26 would page MS 20 over a radio control channel. Upon detecting the page, MS 20 would then send an origination request to BSC 26, seeking to acquire a radio link. And BSC 26 would then assign a traffic channel to MS 20 and send the packet data to the MS 20 over that traffic channel.

b. Exemplary Mobile Station

Figure 4:
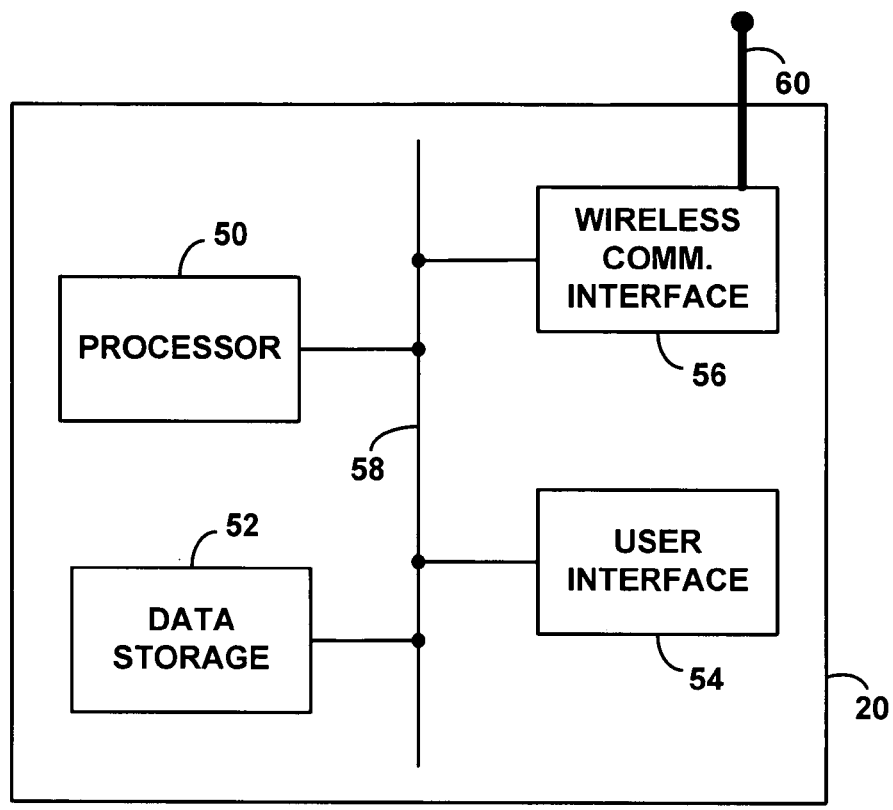
FIG. 4 is a block diagram of an exemplary mobile station for use in the arrangement of FIG. 3.

In the exemplary embodiment, MS 20 can be a conventional 3G mobile station of the type well known in the art. But MS 20 is further equipped with logic to carry out various additional functions described herein. FIG. 4 is a block diagram showing exemplary components of MS 20, including a processor 50, data storage 52, a user interface 54, and a wireless communication interface 56, coupled together by a system bus 58.

Processor 50 may be a general purpose programmable microprocessor and/or a dedicated digital signal processor. And data storage 52 may comprise volatile and/or nonvolatile storage (such as flash memory or a storage drive for instance), preferably holding reference data and program instructions (e.g., machine language instructions) that can be executed by the processor 50

The reference data in storage 52 may include one or more device identifiers (device IDs) that have been assigned to uniquely identify MS 20 and/or a user of MS 20. Examples of such identifiers include a mobile identification number (MIN), a mobile directory number (MDN), an electronic serial number (ESN), a network access identifier (NAI), and a SIP address, the meaning of each of which is well known to those skilled in the art. A device ID could be programmed into the MS upon manufacture or initial activation of the MS, and a wireless carrier may also maintain a record of the device ID in the network for use in processing communications keyed to that ID (e.g., communications placed to or from the MS). For instance, a carrier could load into device capabilities store 36 a profile record keyed to the device ID, setting forth capabilities of MS 20, which the carrier may reference while serving the MS.

The program instructions in storage 52 may define basic logic, such as an IP stack for carrying out IP communications over network 30, a SIP stack for engaging in SIP signaling over network 30, and logic for communicating real-time media (e.g., voice, audio and/or video) over network 30 (such as to digitize, encode and packetize outgoing media as an industry standard RTP stream, and to depackeize, decode and play out incoming media).

Further, the program instructions may define some special logic in accordance with the exemplary embodiment. For example, the program instructions may define logic to generate and send to TA 34 a registration-instruction when MS 20 establishes a data link and acquires an IP address. The registration-instruction could convey an indication of one or more device IDs of the MS, as well as the IP address that has been assigned to the MS, and/or any other information that would allow TA 34 to register on behalf of the MS (such as username and password data for instance). Further, in the exemplary embodiment, the registration message can convey information about the capabilities of the MS, which TA 34 could store and then later reference to facilitate responding to a session invitation message on behalf of the MS.

As another example, the program instructions may define logic to receive and respond to an initiation-message from TA 34. The initiation-message would preferably include sufficient information to allow MS 20 to understand aspects of the requested session, such as the type of session (e.g., RTP, FTP, etc.) and the IP address of the originating node. And the logic could be arranged to positively acknowledge the initiation-message by sending a positive response signal back to the TA.

In this regard, the form of signaling between MS 20 and TA 34 is not critical, provided that MS 20 and TA 34 understand what is being communicated. Thus, for instance, the signaling could take the form of packetized bit patterns that MS 20 and TA 34 are programmed to interpret and understand. Alternatively, the signaling could be SIP signaling. Other examples are also possible.

Further, in the exemplary embodiment, the logic could require MS 20 to send all outgoing packet-data communications to TA 34 as a proxy server. Such a requirement would be advantageous, as it would allow TA 34 to be aware of the communication state of MS 20, such as to know whether or not MS 20 is engaged in a session at any given moment.

User interface 54, in turn, may provide some conventional input/output functions for interacting with a user of MS 20 through aural and/or visual means. And wireless communication interface 54, in combination with an antenna 60, may function to communicate over air interface 22 with BTS 24 and in turn with BSC 26. An exemplary wireless communication interface 54 may, for instance, comprise a cdma2000 chipset of a type well known to those skilled in the art. Alternatively, the wireless communication interface may be arranged to comply with one or more other air-interface protocols.

C. Exemplary Terminal Agent

Figure 5:
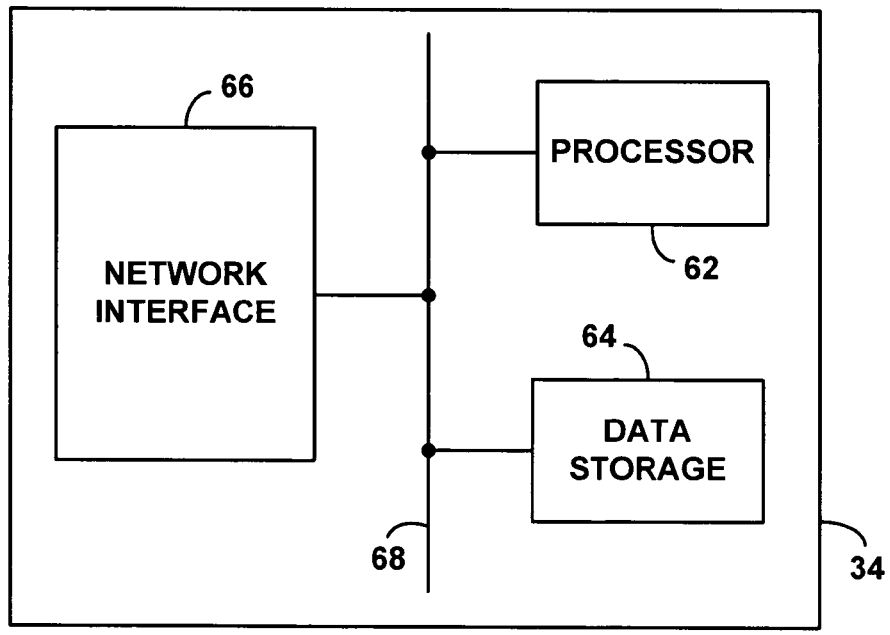
FIG. 5 is a block diagram of an exemplary terminal agent for use in the arrangement of FIG. 3.

An exemplary TA 34 may comprise one or more server-class computers accessible at a defined IP address on network 30. FIG. 5 is a block diagram depicting exemplary components of such a TA 34, including a processor (e.g., one or more general purpose processors and/or dedicated processors) 62, data storage (e.g., volatile and/or nonvolatile storage) 64, and network interface (e.g., an Ethernet network interface card) 66, coupled together by a bus, network or other mechanism 68. TA preferably sits at a defined IP address on network 30.

In the exemplary embodiment, data storage 64 holds program instructions that are executable by the processor 62 to carry out various functions described herein. As such, the program instructions may define some basic network communication logic, such as an IP stack and a SIP stack, and proxy logic conventionally able to receive and forward IP communications passing to or from MS 20. Preferably, the proxy logic also includes state logic, which records the state of communications by MS 20 at any given moment, such as whether or not MS 20 is currently engaged in a session.

Further, the program instructions preferably define some special logic for carrying out the exemplary embodiment. As an example, the program instructions may define logic to receive a registration-instruction from MS 20 and to responsively (i) record in registration server 38 a correlation between a device ID of MS 20 and the IP address of TA 34 and (ii) record in data storage 64 a correlation between the device ID of MS 20 and the IP address of MS 20.

For instance, when the logic receives a registration-instruction from MS 20, the logic could read the message to determine at least one device ID and IP address of the MS and could record a correlation between those parameters in data storage 64. The logic could then send a signal to registration server 38 in some predefined form, such as in a SIP REGISTER message for instance, directing server 38 to record a correlation between the device ID of MS 20 and the IP address of TA 34. If the registration server 38 sends an authentication challenge back to TA 34, the logic could respond to that challenge by signaling with MS 20 to obtain a username and password for authentication (if the TA did not already receive that information from MS 20).

As another example, upon registration of MS 20, the logic could responsively query device capabilities store 36 to acquire a copy of a device profile for MS 20, indicating capabilities of MS 20 such as types of sessions in which MS 20 can participate and so forth. The logic could then store that capabilities information in data storage 64 for later reference. Alternatively, as noted above, the logic could receive capabilities information in the registration message from MS 20, and the logic could store that capabilities information in data storage 64 for later reference.

And as another example, the program instructions could define logic to receive a session-invitation that seeks to set up a session with MS 20, and to respond to the session invitation on behalf of MS 20 without first receiving a positive acknowledgement from MS 20 and perhaps even without first sending a notification of the session initiation effort to MS 20.

For instance, the logic could receive a SIP INVITE seeking to set up a certain type of session with MS 20, and the logic could responsively refer to data capabilities store 36 (or to a locally stored profile for MS 20, which may contain information provided by MS 20 in a registration message) to determine whether MS 20 is capable of engaging in the type of session. If so, the logic could then reply with a SIP 200 OK, indicating that the session can be set up, and perhaps including a session description protocol (SDP) block describing capabilities of MS 20 as indicated in capabilities store 36 (or in the local profile).

The logic could also be arranged (i) to refer to the state logic noted above in order to determine whether MS 20 is currently engaged in a communication session and (ii) to positively respond to a session invitation only if MS 20 is not currently engaged in a session (or is not in another mode, such as "Do Not Disturb," in which MS 20 is unavailable to participate).

Before or after positively responding to the session invitation on behalf of MS 20, the logic can signal to the MS to notify the MS of the session initiation effort. As noted above, for instance, the logic could send to the MS an initiation-message that preferably conveys enough information to the MS to allow the MS to understand the type of session being initiated as well as the IP address of the originating endpoint (i.e., the entity with which MS will ultimately communicate). In turn, at some point after the logic has positively responded to the originating end, the logic may receive from MS 20 a positive acknowledgement in response to the initiation-message.

3. Exemplary Operation

Figure 6:
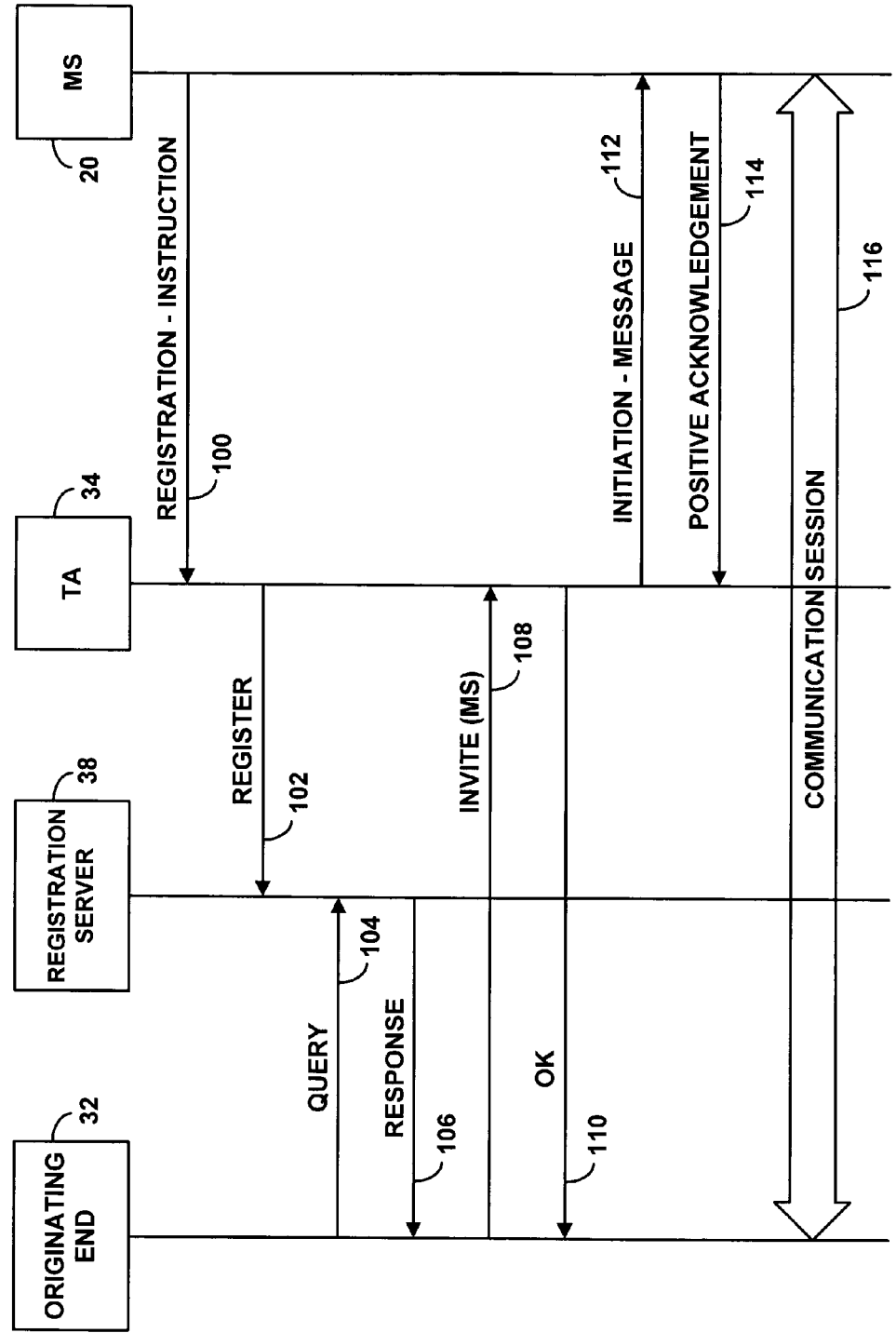
FIG. 6 is a message flow diagram illustrating some of the functions that could be carried out in accordance with the exemplary embodiment.

Referring next to FIGS. 6 and 7, message flow diagrams are provided to help illustrate process steps that could be carried out by the elements in FIG. 3, in accordance with the exemplary embodiment. The example message flows of FIGS. 6 and 7 assume that MS 20 has just acquired a radio link from BSC 26 and a data link and IP address from PDSN, so that MS is initially in an active mode and can engage in packet data communications over network 30.

FIG. 6 depicts a scenario in which TA 34 positively responds to the originating end before even sending an alert to MS 20 to notify MS 20 of the session initiation effort. And FIG. 7 depicts a scenario in which TA 34 first sends an initiation-message to MS 20 and then sends a positive response to the originating end before receiving a positive acknowledgement from MS 20.

In FIG. 6, at step 100, MS 20 programmatically responds to its acquisition of an IP address by sending a registration-instruction to TA 34. The registration-instruction may indicate a device ID, such as a SIP address of MS 20 (or of a user operating MS 20), as well as the IP address assigned to MS 20. TA then preferably reads that information and records it in its local data storage 64.

At step 102, TA then sends to registration server 38 a registration message, such as a SIP REGISTER message, correlating the device ID of MS 20 with the IP address of TA 34. That way, if an entity queries registration server 38 to determine where to send a communication destined for MS 20 and keyed to that device ID, the registration server would direct the communication to the IP address of TA 34.

Thus, for instance, originating end 32 may want to send a session invitation such as a SIP INVITE to the SIP address of MS 20. To determine where to send it on network 30, at step 104, the originating end could query registration server 38. And, at step 106, the registration server would instruct the originating end to route the INVITE to the IP address of TA 34. And at step 108, the originating end would thus route the INVITE to TA 34. (Alternatively, originating end 32 could send the INVITE to a proxy server, which could then query registration server 38, learn where to send the INVITE and send the INVITE. And still alternatively, originating end 32 or a proxy server could send the INVITE to registration server 38 and registration server 38 could forward the INVITE to the IP address of TA 34.)

Once TA 34 receives the INVITE, in accordance with the exemplary embodiment, TA 34 may reference device capabilities information and/or state information and thereby determine that MS 20 is available and able to participate in the session. At step 110, TA 34 may then positively acknowledge the INVITE, such as by sending a SIP 200 OK to the originating end 32, before even notifying MS 20 that the session has been requested. (Alternatively, the response could be a negative response, if the session should not be established for some reason.)

Thereafter, at step 112, TA 34 will send an initiation-message to MS 20, notifying MS 20 of the session initiation effort. For instance, TA 34 may refer to its local correlation of the device ID of MS 20 and the IP address of MS 20 to determine the IP address of MS 20, and TA 34 may then send the initiation-message to that IP address.

By this time, however, it is possible that MS 20 would have lost its radio link and become dormant. Thus, in order for MS 20 to receive this initiation-message as application-layer data, BSC 26 may page MS 20, MS 20 may request a radio link, and BSC 26 may assign a radio link. Although this process of newly acquiring a radio link may take some time, fortunately it will not delay the session setup process (or at least it could delay it less), because TA 34 would have already responded to the INVITE at step 110.

At step 114, if MS 20 agrees to participate in the session, MS 20 may then send a positive acknowledgement to TA 34 in response to the initiation-message.

Once TA 34 and originating end 32 complete session setup signaling, TA 34 may notify MS 20 that the session is ready to begin. At step 116, MS 20 and originating end 32 may then begin communicating with each other, such as by exchanging packetized real-time media or other data.

Steps 100 to 108 in FIG. 7 are the same as those in FIG. 6. Continuing from that point in FIG. 7, after TA 34 receives an INVITE from the originating end 32, TA 34 may reference device capabilities information and/or state information and thereby determine that MS 20 is available and able to participate in the session. At step 118, TA 34 may then send an initiation-message to MS 20 (i.e., to be delivered to MS 20), notifying MS 20 of the session initiation effort. After sending the initiation-message to MS 20, at step 120, TA 34 may then positively acknowledge the INVITE, such as by sending a SIP 200 OK to the originating end 32.

Meanwhile (or thereafter), the initiation-message that TA 34 sent to MS 20 will be delivered to MS 20, which may require waking up MS 20 if MS 20 is in a dormant state. At step 122, MS 20 may then send a positive-acknowledgement to TA 34 in response to the initiation request. And at step 124, communication between the originating end 32 and MS 20 may proceed.

Finally, note that TA 34 could be arranged to buffer real-time media that arrives from originating end 32. Thus, if media arrives before MS 20 is ready to receive the media, TA 34 could buffer the media. Once MS 20 is ready to receive the media, TA 34 can then transmit the buffered media, followed by any further media, to MS 20.

4. CONCLUSION

An exemplary embodiment of the present invention has been described above. Those skilled in the art will understand, however, that changes and modifications may be made to this embodiment without departing from the true scope and spirit of the present invention, which is defined by the claims.

For example, aspects of the exemplary embodiment described above in connection with the wireless communication system could be extended to apply as well in a landline system. And as another example, the exemplary embodiment could be extended to apply in a circuit-switched network arrangement. Other examples are possible as well.

We claim:

1. A method of reducing call setup delay in a communication system, the method comprising:

receiving into a terminal agent a request to initiate a communication session with a client station;

in response to the request, the terminal agent sending an initiation-message to the client station; and the terminal agent responding to the request without first receiving from the client station a response to the initiation-message, wherein responding to the request comprises positively acknowledging the request, and wherein positively acknowledging the request comprises sending positive response (i) indicating that the session can be set up with the client station and (ii) indicating at least one device capability of the client station.

2. The method of claim 1, wherein the request is a Session Initiation Protocol (SIP) INVITE, the response is a SIP 200 OK, and the at least one device capability of the client station is indicated in a Session Description Protocol (SDP) block in the SIP 200 OK.

3. The method of claim 1, further comprising:

querying a device capabilities store to determine the at least one device capability of the client station.

4. The method of claim 1, further comprising:

receiving from the client station a registration message containing an indication of the at least one device capability of the client station.

5. The method of claim 1, wherein the request to initiate a communication session with the client station originates from an entity selected from the group consisting of a conference server, a switch and a gateway.

6. The method of claim 1, wherein the client station comprises a wireless client station, and wherein sending the initiation-message to the client station comprises:

sending the initiation-message to the client station via an air interface.

7. The method of claim 6, further comprising a base station controller paging the wireless client station over a control channel to cause the wireless client station to acquire a radio link over which the wireless client station can receive the initiation message.

8. The method of claim 1, wherein the communication session is a real-time media session.

9. The method of claim 1, further comprising recording in a registration server a correlation between an identifier of the client station and a network address of the terminal agent.

10. The method of claim 8, further comprising using the correlation to direct the request to the network address of the terminal agent.

11. The method of claim 1, wherein the client station has an access channel, and wherein the terminal agent sits within the access channel of the client station.

12. The method of claim 1, wherein responding to the request occurs before sending the initiation-message to the client station.

13. The method of claim 1, wherein sending the initiation-message to the client station occurs before responding to the request.

14. The method of claim 1, further comprising:
receiving from the client station a response to the initiation-message.

15. The method of claim 14, wherein responding to the request without first receiving from the client station a response to the initiation-message comprises:
responding to the request without thereafter receiving from the client station a response to the initiation-message.

16. The method of claim 1, further comprising:
receiving a registration-instruction into the terminal agent from the client station, the registration-instruction providing an identifier of the client station; and
sending a registration message from the terminal agent to a registration server, to register a correlation between (i) the identifier of the client station and (ii) a network address of the terminal agent.

17. The method of claim 16, wherein the registration-instruction further provides a network address of the client station, the method further comprising:
the terminal agent storing a correlation between the identifier of the client station and the network address of the client station.

18. The method of claim 16, wherein the client station is a wireless terminal, and wherein:
receiving the registration-instruction from the client station comprises receiving the registration-instruction over an air interface; and
sending the initiation-message to the client station comprises sending the initiation-message to the client station over the air interface.

19. The method of claim 16, wherein:
receiving the registration-instruction from the client station comprises receiving the registration-instruction as packetized binary data; and
sending the initiation-request message to the client station comprises sending the initiation-request message to the client station as packetized binary data.

20. The method of claim 16, wherein the identifier of the client station comprises an identifier of a user of the client station.

21. The method of claim 16, wherein the identifier of the client station comprises a SIP address.

22. The method of claim 16, wherein the communication session is a real-time media session.

23. A terminal agent for reducing call setup delay in a communication system, the terminal agent comprising a network interface, a processor, and data storage,
wherein the terminal agent is arranged to (i) receive a session initiation request seeking to set up a communication session with a client station, (ii) to send to the client station an initiation-message notifying the client station of the request, and (iii) to positively respond to the session initiation request without first receiving from the client station a response to the initiation-message,
wherein the terminal agent responds to the session initiation request before sending the initiation-message to the client station, and
wherein the session initiation request comprises a Session Initiation Protocol (SIP) INVITE request message, and the response comprises a SIP 200 OK message.

24. The terminal agent of claim 23, further comprising machine language instructions stored in the data storage and executable by the processor to send the initiation-message and to respond to the session initiation request.

25. The terminal agent of claim 23, wherein the terminal agent is further arranged to receive a registration-instruction from the client station and to responsively register at a registration server a correlation between an identifier of the client station and a network address of the terminal agent.

26. The terminal agent of claim 25, further comprising machine language instructions stored in the data storage and executable by the processor to receive and respond to the registration-instruction.

* * * * *